United States Patent [19]

Morita et al.

[11] Patent Number: 5,573,442
[45] Date of Patent: Nov. 12, 1996

[54] APPARATUS FOR MEASURING A CUTTING BLADE WIDTH IN A CUTTING APPARATUS

[75] Inventors: Toshiaki Morita, Kaiso-gun; Toshiro Ochi, Wakayama, both of Japan

[73] Assignee: Shima Seiki Manufacturing Limited, Wakayama, Japan

[21] Appl. No.: 292,225

[22] Filed: Aug. 22, 1994

[30] Foreign Application Priority Data

Aug. 20, 1993 [JP] Japan .................... 5-206740

[51] Int. Cl.$^6$ .................... B24B 49/00
[52] U.S. Cl. .................... 451/8; 451/5; 451/58; 83/62.1; 83/114
[58] Field of Search .................... 451/5, 6, 8, 9, 451/10, 11, 14, 21, 58, 22, 45, 419, 421, 422, 423; 83/62.1, 174, 174.1

[56] References Cited

U.S. PATENT DOCUMENTS

| | | | |
|---|---|---|---|
| 4,033,214 | 7/1977 | Pearl | 83/174 |
| 4,133,233 | 1/1979 | Pearl . | |
| 4,133,235 | 1/1979 | Gerber | 83/174 |
| 4,201,101 | 5/1980 | Gerber | 83/174 |
| 4,295,301 | 10/1981 | Barth et al. | 451/22 |
| 4,442,599 | 4/1984 | Clark | 83/174 |
| 4,643,061 | 2/1987 | Gerber | 83/174.1 |
| 4,732,064 | 3/1988 | Pearl | 451/58 |
| 4,762,040 | 8/1988 | Alcantara Perez et al. | 451/58 |
| 4,984,492 | 1/1991 | Gerber . | |
| 4,991,481 | 2/1991 | Gerber . | |
| 5,044,238 | 9/1991 | Etcheparre et al. | 451/423 |
| 5,067,378 | 11/1991 | Gerber | 451/58 |
| 5,152,203 | 10/1992 | Werschke | 451/422 |
| 5,303,515 | 4/1994 | Etcheparre et al. | 451/421 |

FOREIGN PATENT DOCUMENTS

| | | |
|---|---|---|
| 20 44 540 | 12/1981 | Germany . |
| 40 20 199 | 10/1992 | Germany . |
| 41 18 329 | 12/1992 | Germany . |
| 40 20 200 | 12/1992 | Germany . |
| 54-96888 | 7/1979 | Japan . |
| 57-14957 | 3/1982 | Japan . |
| 57-194865 | 11/1982 | Japan . |
| 1294800 | 11/1972 | United Kingdom . |
| 2098108 | 11/1982 | United Kingdom . |

*Primary Examiner*—Bruce M. Kisliuk
*Assistant Examiner*—Derris H. Banks
*Attorney, Agent, or Firm*—Wenderoth, Lind & Ponack

[57] ABSTRACT

An apparatus for measuring the width of a cutting blade in a linear motor is activated when the cutting blade is raised. A working pin is advanced and one end of a detecting pin is abutted against an edge of the cutting blade. Thereafter, the working pin is returned. The blade width is derived by deducting the number of inputted driving pulses in returning from the advanced position of the detecting pin. The cutting blade is polished each polishing cycle for predetermined times by polishing rollers. The width of the cutting blade is measured by blade width detecting means during each predetermined polishing cycle. The measurement value of the blade width is fed back into a control device so that the subsequent polishing time of the cutting blade with the polishing rollers is adjusted until it becomes appropriate. The expiration of the useful life of the polishing rollers is determined when a long polishing time is required.

19 Claims, 13 Drawing Sheets

# APPARATUS FOR MEASURING A CUTTING BLADE WIDTH IN A CUTTING APPARATUS

BACKGROUND OF THE INVENTION

1. Field of the Invention

The present invention relates to a measuring apparatus for measuring a cutting blade width of a cutting machine, for polishing the cutting blade as needed, and for automatically cutting a sheet material such as a dishcloth by computer control.

2. Description of the Related Art

Hitherto, automatic computer controlled cutting machines have been employed for cutting flexible sheets of material such as textile fabric, knitted fabric, paper, plastic, and leather sheet. A cutting blade for cutting sheet materials becomes dull as cutting is continued, and hence it is necessary to frequently polish/sharpen the cutting blade. Therefore, the cutting machine is required to have a cutting blade polishing apparatus in order to continue cutting while polishing.

The cutting blade is made of a hard metal material such as stainless steel and high speed tool steel. Nevertheless, the blade edge gradually wears due to frequent polishing. Consequently, it is necessary to provide the control apparatus in prior art cutting machines with data to compensate for the change in blade width. The data is obtained by an operator with a measuring tool, such as calipers and a gauge, so that the wear amount of the blade edge can be compensated and accurate cutting can be carried out along a cutting line.

In the prior art, in order to measure the blade width with a gauge, it is necessary to waste an inordinate amount of time, for example, removing respective parts enveloping the periphery of the cutting blade, which results in decreased productivity.

A typical prior art cutting machine, having a polishing apparatus is disclosed in Japanese Examined Patent Publication JP-B2 57-14957 (1982) corresponding to U.S. Pat. No. 4,133,233 and Japanese Unexamined Patent Publication JP-A 57-194865 (1982). In the prior art machine, a polishing mechanism is provided near the cutting blade, and it is designed to allow polishing during the down time between cutting operations or during a cutting operation.

Further, as disclosed in the Japanese Unexamined Patent Publication JP-A 54-96888 (1979), corresponding to the Japanese Examined Patent Publication JP-B2 57-14957 (1982), a compensating control apparatus automatically compensates for a loss of cutting blade width caused by the grindstone. By means of the control apparatus, the changes in the blade width are compensated on the basis of the wear amounts obtained from values recorded by a polishing cycle counter.

In the prior art, the blade width is not actually measured, rather it is estimated on the basis of the wear amounts of the cutting blade which are determined from the number of times the blade is polished and the amount of polishing time. Accordingly, depending on the working condition of the grindstone, errors in estimating the blade width occur, and accurate cutting according to a pattern cannot be achieved due to accumulation of the errors. Further, in the case where it is necessary to replace the cutting blade, the wear data regarding the previous cutting blade is stored regardless of the specific kind of cutting blade, so that it is necessary to modify the data to correspond with the replacement cutting blade. This modification requires excessive time and labor.

Similar problems occur when a cutting blade replacement is required due to a malfunction during the cutting operation.

Although a mechanism for polishing the cutting blade is disclosed in the prior art, the concept of controlling the amount of polishing which is directly related to the amount of cutting blade wear is not disclosed. However, insufficient polishing leads to insufficient cutting sharpness of the cutting blade, and a favorable cutting result cannot be obtained. On the other hand, excessive polishing leads to early wearing and a shortened life of the cutting blade and grindstone.

FIG. 12 illustrates a relationship between the polishing frequency and the polishing amount, i.e. change in width of a cutting blade. When polishing is repeated under certain conditions, the relationship between the polishing frequency and amount did not represent a straight line as indicated by the twin dot chain line, but instead represented an upward convex curve as indicated by the solid line. When polished more than 2000 times, it is estimated that the polishing amount will be smaller than that in the line indicated by the twin dot chain line. Such a change in polishing amount is caused by clogging or wearing of the grindstone resulting in reduced polishing performance.

If an automatic polishing mechanism is incorporated in a cutting machine as in the disclosed prior art, it is generally set to polish slightly excessively in consideration of the lowering performance of the grindstone. Accordingly, blade and grindstone life is shortened because the wearing of the cutting blade and grindstone is accelerated. Additionally, since lowering of the polishing performance of grindstone cannot be detected accurately, the timing of replacement or inspection of the grindstone is often determined on the basis of operator experience, and therefore it is difficult to keep the cutting blade in an optimal cutting condition without shortening blade life.

FIGS. 13A, 13B show general relationships between polishing time and polishing amount. FIG. 13A shows the relationship between the cumulative polishing time and amount of grindstone, and FIG. 13B shows the relationship between the polishing time and individual amount of cutting blade. As shown in FIGS. 13A, as the cumulative polishing time of the grindstone increases, the polishing amount indicated by the solid line comes to deviate from the straight line indicated by the twin dot chain line. Accordingly, in the initial state of the grindstone in the period of t0 to t1, the polishing performance is as indicated by a line La in FIG. 13B, but in the terminal state of the grindstone in the period of t2 to t3, the polishing performance is as indicated by line Lb. When the polishing performance is indicated by the line Lb, it takes a longer time to get the same polishing amount of the cutting blade than when the polishing performance is indicated by the line La. When operating at line Lb the efficiency is low, and the useful grindstone life is over. That is, for one grindstone, when the polishing amount reaches A, it has reached the end of its useful life. As shown in FIG. 13B, the time it takes to reach the end of the cutting blade useful life is much shorter than the life of the grindstone. Thus, the cumulative polishing time of the grindstone and the polishing amount of the cutting blade vary substantially with the polishing performance of the grindstone.

SUMMARY OF THE INVENTION

It is an object of the invention to provide a blade width measuring apparatus capable of promptly and accurately measuring the blade width regardless of the material and working condition of a grindstone and the specific type of cutting blade.

It is a further object of the invention to provide a cutting blade width measuring apparatus for optimally controlling a polishing mechanism of a cutting machine and a method of measuring the blade width.

The invention provides an apparatus for measuring the width of a sheet material cutting blade. The cutting blade reciprocates along an axis perpendicular to a supporting plane on which the sheet material is placed and the edge of the cutting blade is moved into a cutting direction.

The measuring apparatus includes a position setting means for moving the cutting blade into a measuring position at which the cutting blade is withdrawn from the sheet material; direction setting means for directing the edge of the cutting blade to a measuring direction predetermined in a plane perpendicular to the reciprocating direction; position detecting means for detecting the cutting blade edge in a predetermined position and direction; and operation-processing means for deriving a cutting blade width from the difference between the blade edge position detected by the position detecting means and a predetermined reference position.

The position is characterized in that the apparatus includes compensation control means for controlling the cutting operation of the cutting blade so that a wear amount of the cutting blade can be calculated on the basis of the blade width which is derived from the operation of the operation-processing means.

The invention is further characterized in that the cutting blade is freely rotatable about an axis parallel to the reciprocating direction and the blade is inserted into the center portion of a freely rotatable cylindrical body which changes the blade edge direction. At least a part of the position detecting means is arranged in the freely rotatable cylindrical body in close proximity to the cutting blade.

Further, the invention is characterized in that part of the position detecting means is inserted through the freely rotatable cylindrical body. The detecting means includes a detecting member for detecting the position of the blade edge whether it is in contact with the blade edge or not, and driving means for driving the detecting member toward the blade edge is positioned outside of the freely rotatable cylindrical body.

Further, the cutting blade width measuring apparatus of the invention is characterized in that the cutting machine is provided with a polishing apparatus for repeatedly polishing the cutting blade during operations of the cutting machine according to predetermined conditions. The width measuring apparatus includes measuring means for measuring a polishing amount of the cutting blade and control-means for comparing the measured polishing amount with a polishing amount predetermined as an appropriate one in response to an output from the measuring means. The polishing is decreased in the next polishing operation if the measured polishing amount is excessive, or the polishing amount is increased in the next polishing operation if the measured polishing amount is insufficient, thereby bringing the polishing amount in next polishing operation closer to the appropriate polishing amount.

The control means of the invention is characterized by decreasing or increasing the polishing amount by decreasing or increasing the polishing time in one polishing operation.

Further, according to the invention, the blade edge position is detected by position detecting means such that the blade position and the blade edge direction have been predetermined. Since the blade width is calculated as a difference between the blade edge position and the reference position, the blade width can be accurately determined regardless of the condition and type of cutting blade.

Further, according to the invention, the wear amount of the cutting blade is calculated according to the measured blade width and the cutting operation of the cutting blade is controlled so as to compensate for the wear amount. Thereby, accurate cutting can be carried out even when the cutting blade has been worn due to polishing.

Further, according to the invention, at least a part of the position detecting means is arranged in a freely rotatable cylindrical body in close vicinity to the cutting blade and the cutting blade is inserted into the center portion of the cylindrical body. That makes it possible to make the measuring apparatus small in size and to promptly and accurately detect the cutting blade position from a position close to the cutting blade.

Further, according to the invention, the detecting member is driven from the outside of the freely rotatable cylindrical body and the blade edge position is detected by detecting the contact of the detecting member with the blade edge. The contact is easily detected and therefore the blade width can be promptly and accurately measured.

Further, according to the invention, the measuring means measures the polishing amount of the cutting blade at the time of polishing under predetermined conditions. The controlling means compares a measured polishing amount with a polishing amount predetermined as an appropriate one, and as the result of the comparison, decreases the polishing amount in next polishing cycle if the polishing was excessive or increases the polishing amount if the polishing was insufficient. Thereby, the measured polishing amount is fed back to the control means for changing the next polishing amount so that it will be close to an appropriate amount and, therefore, too much or too little polishing is prevented. The polishing amount of the cutting blade is appropriately controlled so that the life of the cutting blade and grindstone can be extended. Unnecessary polishing which results in wasted time can be avoided. Moreover, a stable cutting quality of the cutting blade can be maintained, resulting in reduction of associated cutting troubles.

Further, according to the invention, the control means decreases or increases a polishing time for one polishing to decrease or increase the polishing amount. The polishing amount is in proportion to the polishing time if other conditions are fixed. Accordingly, it is possible to easily control the polishing amount by decreasing or increasing the polishing time.

As described above, according to the invention, the blade width can be measured by detecting the blade edge position. Since the blade width can be accurately measured, the wear amount can be accurately compensated so that the blade edge position corresponds to the initial position.

Further, according to the invention, since the wear amount of the cutting blade can be calculated and compensated, accurate cutting along a predetermined cutting line can be carried out.

Further, according to the invention, since at least a part of the position detecting means is provided in close proximity to the cutting blade in the freely rotatable cylindrical body, the measuring apparatus can be made small in size and measuring can be promptly and accurately carried out.

Further, according to the invention, since the blade edge position is mechanically and directly detected by contacting the detecting member with the blade edge, the measuring can be promptly and accurately carried out.

Thus, according to the invention, the feedback control is effected so that the polishing amount of the cutting blade may be an appropriate polishing amount. It is not necessary to set an excessive polishing amount in consideration of lowering of polishing performance. As a result, the life of the cutting blade and the polishing grindstone may be extended. Also, since excessive polishing can be prevented, wasted time required for unnecessary polishing can be saved. The grindstone used for polishing gradually declines in polishing performance as the cumulative polishing time becomes longer, and therefore the polishing may be insufficient and the cutting sharpness of cutting blade may deteriorate. However, because of feedback control of the appropriate polishing amount, insufficient polishing can be prevented. Hence, the cutting sharpness of the cutting blade is maintained, and cutting troubles can be reduced. Moreover, since lowering of the polishing performance of the polishing grindstone can be determined, the exchange time and cleaning period for the grindstone can be defined. Hence it is not necessary to periodically replace a still usable grind-stone with a new one or to depend on the experience of the operators to determine replacement intervals. In this way, the grindstone exchange timing can be defined and the number of inspections can be decreased.

BRIEF DESCRIPTION OF THE DRAWINGS

Other and further objects, features, and advantages of the invention will be more explicit from the following detailed description taken with reference to the drawings, wherein.

DETAILED DESCRIPTION OF THE PREFERRED EMBODIMENT

Figure 1:
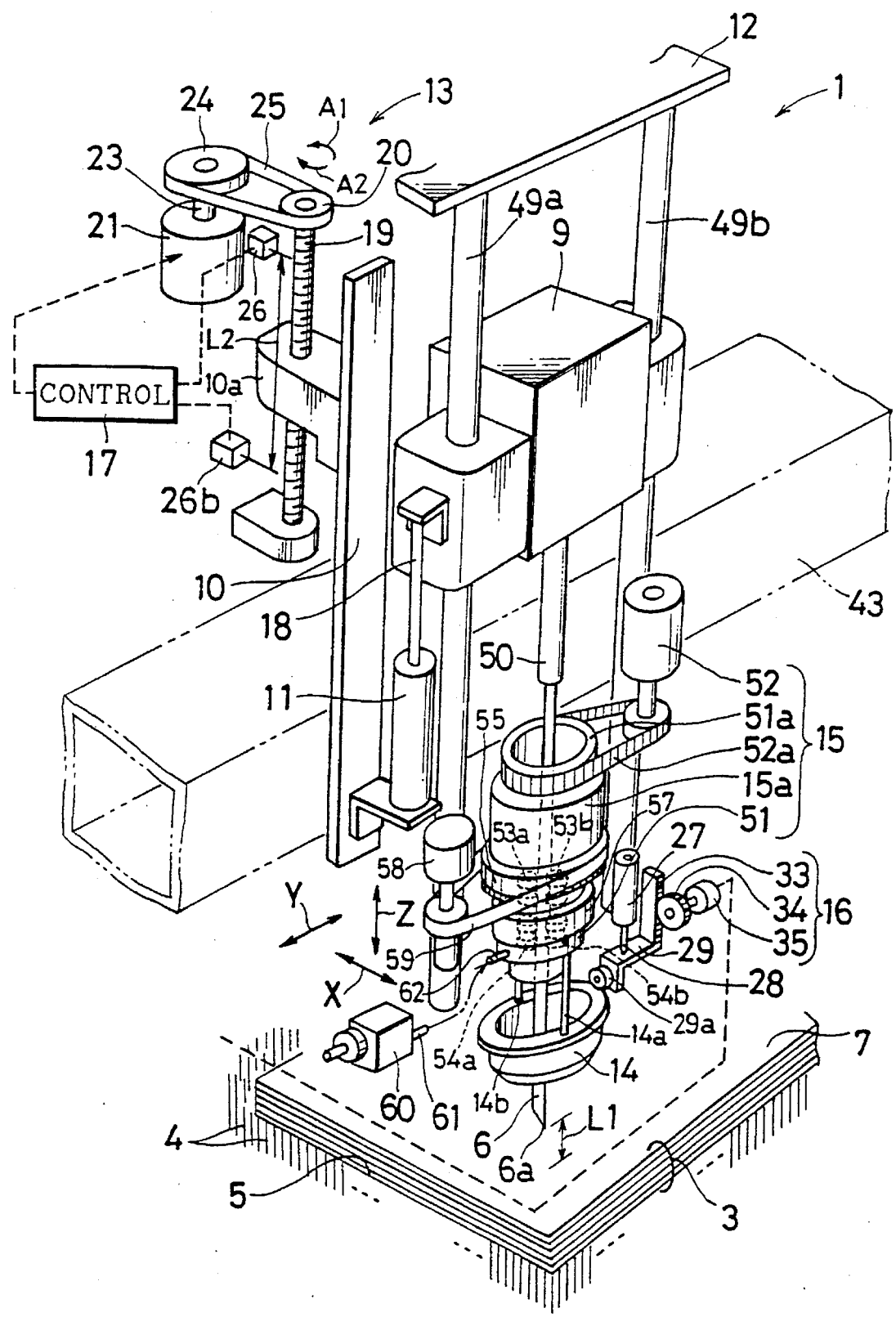
FIG. 1 is a perspective view of one embodiment of the invention showing a simpered view of principal parts of a cutting machine including a cutting blade width measuring apparatus.

Now referring to the drawings, preferred embodiments of the invention are described below.

FIG. 1 is a simplified perspective view showing the basic construction of a cutting head 1 of a cutting machine provided with a blade width measuring apparatus according to one embodiment of the invention. On a flat support surface 5, composed of multiple stiff bristle brushes 4, plural sheet materials 3 such as textile fabrics are stacked in layers. The cutting head 1 of the cutting apparatus for cutting the sheet materials into a desired shape basically comprises a cutting blade 6, a head block 9 for vibrating the cutting blade 6 reciprocally in a direction along the Z-axis by means of a cutting blade vibration motor, a pneumatic cylinder 11 for displacing the head block 9 along the Z-axis, moving means 13 for moving the pneumatic cylinder 11 along the Z-axis so that the edge of the cutting blade 6 may have a predetermined gap L1 from the surface 7 of the sheet materials 3, a foot presser 14 which is for pressing down the sheet materials around the cutting blade 6, position detecting means 16 for detecting the position of the foot presser 14 along the Z-axis, and control means 17 for controlling the moving means 13 in response to the output from the position detecting means 16.

A crank mechanism (not shown) is incorporated in the head block 9. By this crank mechanism, the cutting blade 6 is vibrated reciprocally along the Z-axis. For the purpose of angular displacement of the cutting blade 6 about the Z-axis, a rotation means 15 is provided, and it is adapted to perform a cutting operation while directing the blade edge in a pre-programmed cutting direction. The head block 9 is displaced and driven vertically together with the cutting blade 6 by the pneumatic cylinder 11 along a support frame 12 having a pair of parallel guide shafts 49a, 49b. At the cutting start position, or at a position where the cutting direction is changed by a large angle, a piston rod 18 of the pneumatic cylinder 11 contracts, and the cutting blade 6 penetrates through the sheet materials 3. In a non-cutting position, where the cutting blade 6 is drawn out of the sheet materials 3, the head block 9 is set so that the edge 6a of the cutting blade 6 forms a predetermined gap L1 with the sheet materials. The pneumatic cylinder 11 is fixed on a sliding support plate 10. The lower limit of the head block 9 is defined by the stopper attached to piston rod 18 which determines the cutting position of the cutting blade 6.

The head block 9 includes an output shaft 50 vibrating reciprocally along the Z-axis. The output shaft 50 is attached to the cutting blade 6 so that the blade can be freely angularly displaced and can be detached and attached. The cutting blade 6 extends through a right circular cylindrical main body 15a and a working ring 51. The working ring 51 is freely rotated in the direction of arrows A, B along the Z-axis by the torque transmitted from a motor 52 to an upper gear 51a through a timing belt 52a. The edge of the cutting blade 6 is directed in a cutting direction according to a cutting program. The main body 15a is fixed to the sliding plate 10.

Inside the working ring 51, two pairs of polishing rollers 53a, 54a; 53b, 54b are provided along the cutting blade 6. These rollers are grindstones for polishing, and they do not contact the cutting blade 6 during a cutting operation. The polishing rollers 53a, 54a; 53b, 54b are rotated and driven by an internal gear 55 provided on the working ring 51. The gear 55 rotates coaxially independently of and with the working ring 51. A cam ring 57 provided beneath the internal gear 55 coaxially therewith is restrained from outside when polishing. At this time, according to the rotating direction of the working ring 51, the cam ring is displaced so that the pairs of polishing rollers 53a, 54a; 53b, 54b alternately contact the blade face of the cutting blade 6. The cross-sectional shape of the cutting blade 6 perpendicular to the Z-axis is nearly symmetrical with respect to a straight line passing through the edge. The blade faces intersect at an acute angle at the blade edge. When the blade faces are alternately polished, the blade width of the cutting blade 6 decreases in response to the wear amount of the blade faces. The internal gear 55 is rotated and driven by a motor 58 through a timing belt 59.

The moving means 13 comprises a screw rod 19, a nut member 10a fixed on the sliding plate 10, a pulley 20 fixed at the upper end of the screw rod 19, a Z-axis lift motor 21 for rotating and driving the screw rod 19 in both directions A1, A2, a pulley 24 fixed on an output shaft 23 of the Z-axis lift motor 21, a timing belt 25 stretched between the pulleys 20, 24, and a pair of limit switches 26a, 26b for detecting the upper limit position and lower limit position of the nut member 10a.

When the pneumatic cylinder 11 is extended and the cutting blade 6 is pulled up to the non-cutting position, determined by the moving means 13, the polishing rollers 53a, 54a; 53b, 54b polish the blade edge. Then the blade width is measured. Blade width detecting means 60 includes a working pin 61 which presses and moves detecting pin 62 until it contacts the blade edge. The position of the blade edge corresponds to the wear amount of the cutting blade 6 which can be determined by detecting the change in moving distance of pin 62 and the pressing force applied thereto. That is, when the detecting pin 62 contacts the blade edge, the pressing force is detected, and when the detecting pin 62 is released the pressing force disappears and the position of the blade edge is detected. When the cutting blade 6 is worn, the position of the edge changes relative to the forward end of the detecting pin 62.

Figure 2:
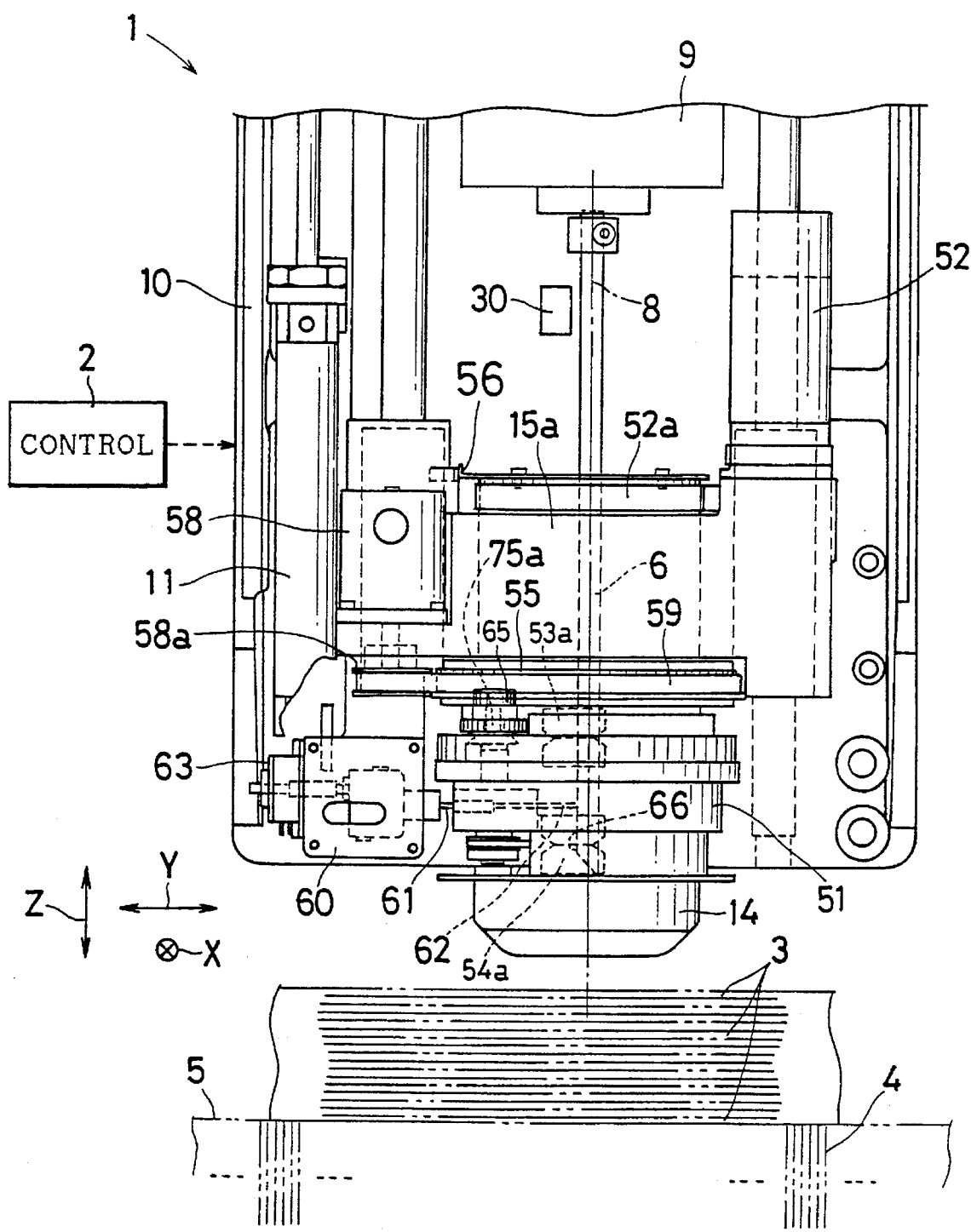
FIG. 2 is a simplified sectional view showing an apparatus for measuring the width of the blade of the embodiment of FIG. 1.

FIG. 2 shows the relative positions of the blade width detecting means 60 and detecting pin 62. An origin cam 56 is provided above the working ring 51. The cam 56 is used for detecting the direction of the edge of the cutting blade 6, i.e. the reference direction about the axis of rotation 8. The blade width can be measured when the edge is in a specific direction. The control means 2 is provided for the purpose of measurement of blade width and feedback control of the polishing amount.

The cutting head 1 is provided with detecting means 30 or the like which is, for example, a proximity switch for detecting the measuring position (the state shown in FIG. 2) where the cutting blade 6 is withdrawn from the sheet materials 3. On the basis of the output from the detecting means 30, the detecting pin 62 is moved toward the blade edge 66 from a position aside the edge 66 of the cutting blade 6 until the pin comes into contact with the blade edge 66. Then the pin is drawn back from edge 66 to the retreat or non-use position. Thereby, an operation for deriving the distance from the retreat position is also conducted by the control means 2.

The measuring position detecting means 30 is attached to the main body 15a and is moved up and down along with sliding plate 10.

The cutting blade extends through the working ring 51 and is relatively freely, vertically displaceable. The working ring 51 is rotated and driven about the axis of rotation 8 by a cutting blade rotary driving motor 52 so that the edge can be directed in a predetermined cutting direction. A rotary gear unit 51a is provided on the lower side of the rotary driving motor 52. A pulley 58a is fixed to the output shaft of the polishing driving motor 58, and a timing belt 59 is stretched from the pulley 58a to the internal gear 55. A planet gear 65 is engaged with the internal gear 55. A shaft 75a, fixed coaxially on the planet gear 54, transmits torque to rotate and drive the polishing rollers 53a, 54a; 53b, 54b. The pairs of polishing rollers are alternately brought into contact with the cutting blade 6 to sharpen or polish the edge 66.

The Z-axis lift motor 21 is mounted on the support frame 12. For example, lift motor 21 may be a stepping motor. The pitch of the screw rod 19 is selected to be about 3 mm/rev. Limit switches 26a, 26b are disposed in upper and lower positions relative to the screw rod leaving a total distance L2 of 50 mm. Assuming a Z-axis lift motor 21 pulse rate of 1000 pulses/sec., the sliding plate 10 can be driven at a rate of 40 mm/sec. When limit switch 26a or 26b is tripped by nut member 10a, the control means 17 issues a signal to stop the Z-axis lift motor 21. The sliding plate 10 is free to slide along the Z-axis in a guide groove (not shown) formed in the frame 12 of the cutting head 1.

The foot presser 14 is fixed to the lower end of guide shafts 14a, 14b which are provided on the working ring 51. Springs are provided at the upper end of the guide shafts 14a, 14b to bias the foot presser 14 in a direction away from the surface 7 of the sheet material 3 along the Z-axis. A pneumatic cylinder 27 fixed to the sliding plate 10, a mounting piece 29 fixed to a front end of a piston rod 28 of the pneumatic cylinder 27, and a roller 29a provided on the lower end of the mounting piece 29 push the foot presser 14 down onto the surface 7 of the sheet material. The stroke of the piston rod 28 is selected, for example, to be between 20 and 30 mm.

The foot presser 14 can be used to detect the laminate thickness of the sheet materials 3. When the sliding plate 10 is lowered by the Z-axis lift motor 21 the piston rod of the pneumatic cylinder 27 is extended. When the foot presser 14 is lowered and abuts against the surface 7 of the sheet materials 3, the Z-axis lift motor 21 is stopped. Such abutting state of the foot presser 14 is detected by position detecting means 16.

The position detecting means 16 includes a mounting piece 29 for mounting the roller 29a, a rack 33 extending upwardly from the mounting piece 29, a pinion 34 to be engaged with the rack 33, and a rotary encoder 35 for detecting the rotation amount of the pinion 34. The rotary encoder 35 is fixed to the main body 15a. When the change of the count value of the rotary encoder 35 reaches an arbitrary preset value, the Z-axis lift motor 21 is stopped.

Figure 3:
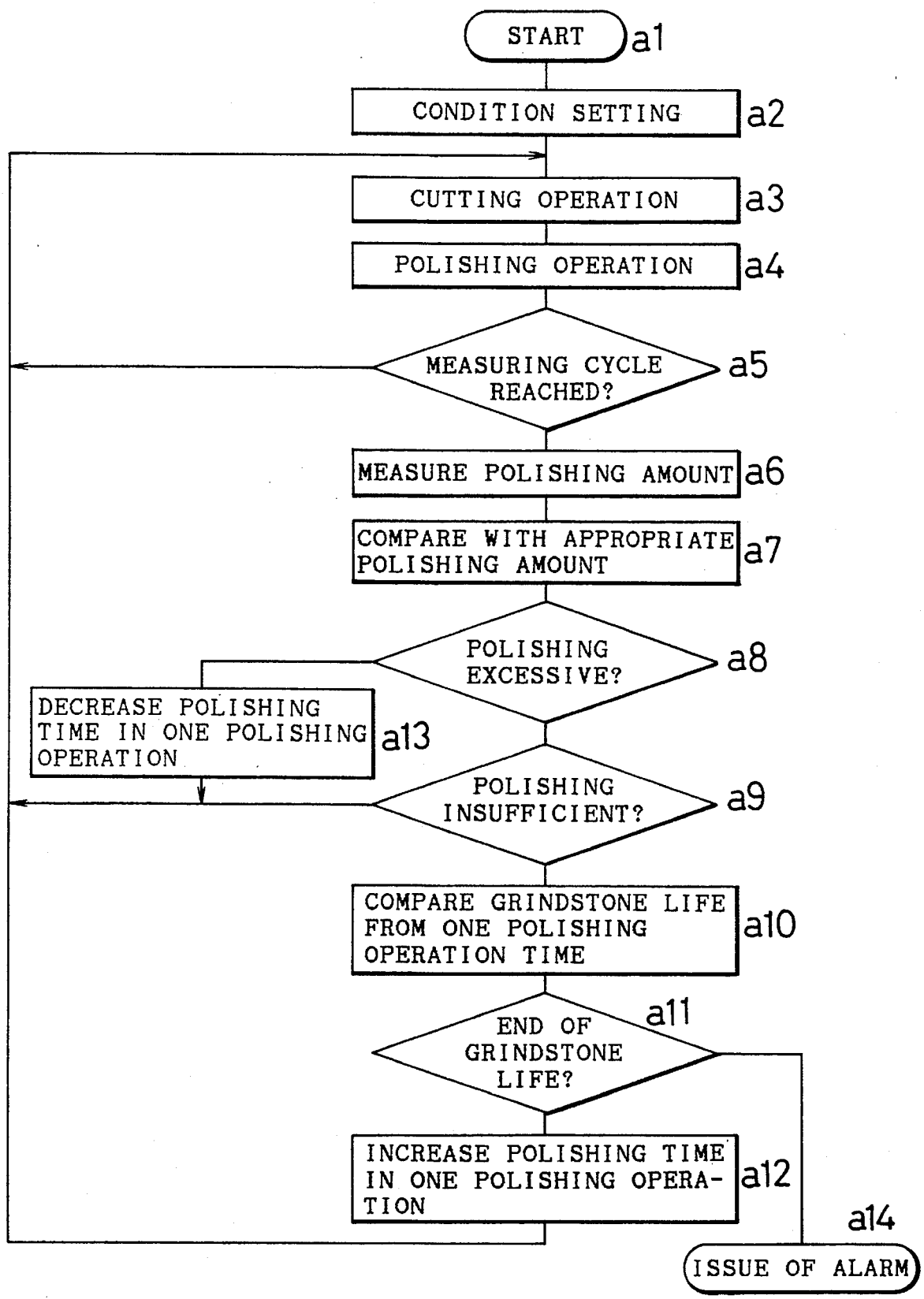
FIG. 3 is a flow chart showing the operation of the embodiment of FIG. 1.

FIG. 3 shows the operation of the control means 2. Starting the operation from step a1, the operating conditions are preset at step a2. The frequency of polishing relative to cutting, the timing of measurement of polishing amount, and the appropriate polishing amount for one polishing action of the cutting blade are preset at step a2. The measurement frequency and appropriate polishing amount are preliminarily set as default values on the basis of the actual data, and the default values are automatically used unless otherwise entered. Or, adequate default values may be selected by entering the kind of sheet materials to be cut, and type of knife, and the type of grindstone. For example, when the fabric is stiff, the appropriate polishing amount is set to a value which is larger than when the fabric is soft. The frequency of polishing may be set with regard to the specific time or specific distance of the cutting operation. As for the timing of the measurement, a specified number of times of the polishing action may be set as a measuring cycle.

Figure 13A:
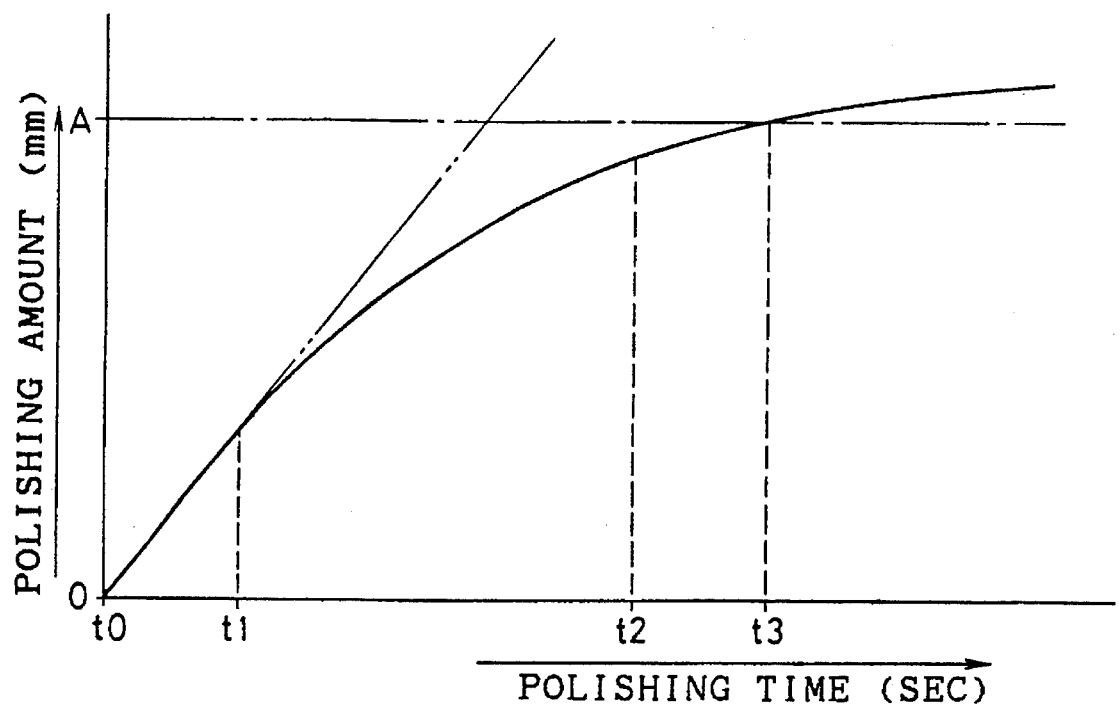
FIGS. 13A, 13B are graphs showing the relationship between the polishing time and polishing amount of an ordinary grindstone and a cutting blade.
Figure 13B:
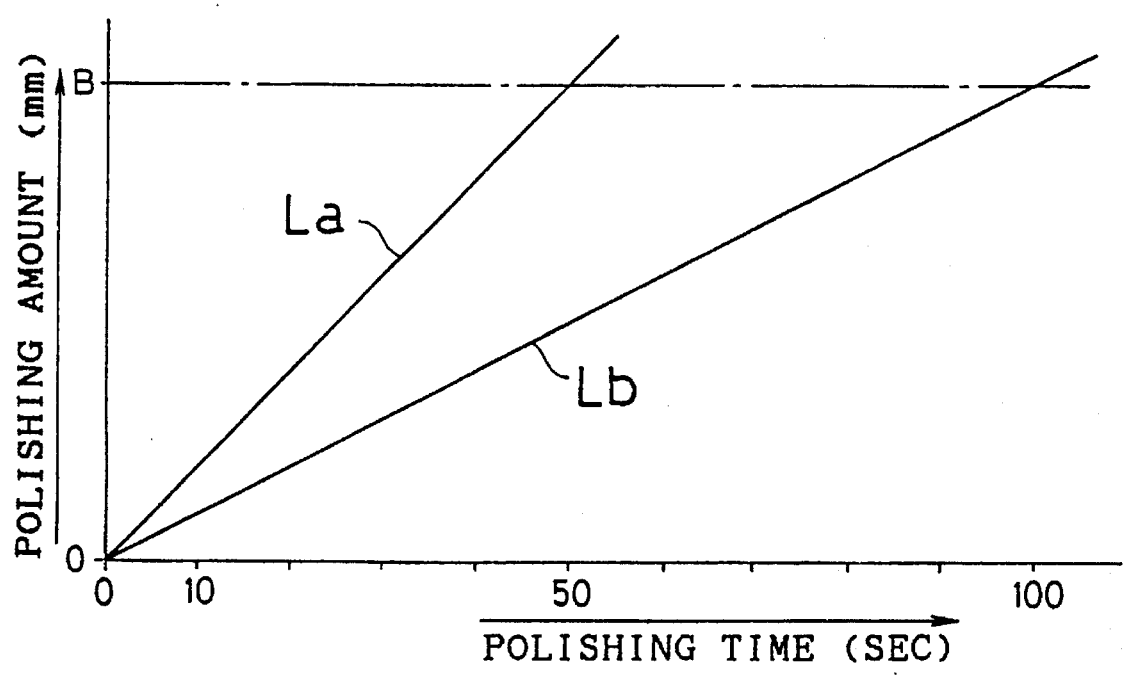

At step a3, the cutting operation of sheet materials is carried out. At step a4, polishing is carried out according to the set conditions. The polishing operation is carried out when the cutting blade is withdrawn from the sheet materials 3 and the angle of the cutting blade 6 is largely changed, or when the cutting head i is transferred to another cutting pattern, or when the cutting has been completed, or when waiting for an advance or transfer of the sheet materials 3. At step a5, it is checked whether the cumulative number of polishing operations has reached the preset measuring cycle. For example, if the preset measuring cycle of about 100 times has not been reached, the operations of step a3 and step a4 are repeated. When the measuring cycle at step a5 is reached, the polishing amount is measured at step a6. Taking measurements during a cutting operation consumes extra time and delays cutting. Therefore measurements are taken when cutting of sheet materials for one marked portion is completed, when waiting for an advance of material, or when the cutting blade 6 is stopped. If the polishing is done in one of those periods, the change of polishing amount consumed by this polishing may be ignored. At step a7, the measured polishing amount is compared with an appropriate polishing amount. At step a8, it is determined whether the polishing is excessive. When the polishing is not excessive, it is determined at step a9 whether the polishing is insufficient. At step a10, when the polishing is determined to be insufficient, the life of the grindstone is checked by comparing the polishing time of one operation. At step a11, it is determined whether one polishing time has reached the grindstone life corresponding to time t3 shown in FIG. 13(A) and if the rate of increase of polishing amount is small relative to the increase polishing time. If the useful grindstone life has not been reached, polishing time is increased at step a12 for one polishing operation so that the polishing amount may approach an appropriate value. If polishing is determined to be excessive at step a8, polishing time for one polishing operation is decreased at step a13 so that the polishing amount may approach an appropriate value. When step a12 and step a13 are completed, the operation returns to step a3 and the above steps and feedback control for making the polishing amount appropriate are carried out. When, at step a11 the grindstone life is determined to be completed, an alarm is issued at step a14 informing the operator that the grindstone should be replaced. Increasing or decreasing the polishing time, for example, is executed by specific amounts of time. If the polishing amount does not become appropriate by one feedback control cycle, it may approach the appropriate value by repeating the feedback control cycle. Or, stored table data based on the life characteristics of the grindstone as shown in FIG. 13, may be used in determining the increasing or decreasing amounts of time.

Figure 4:
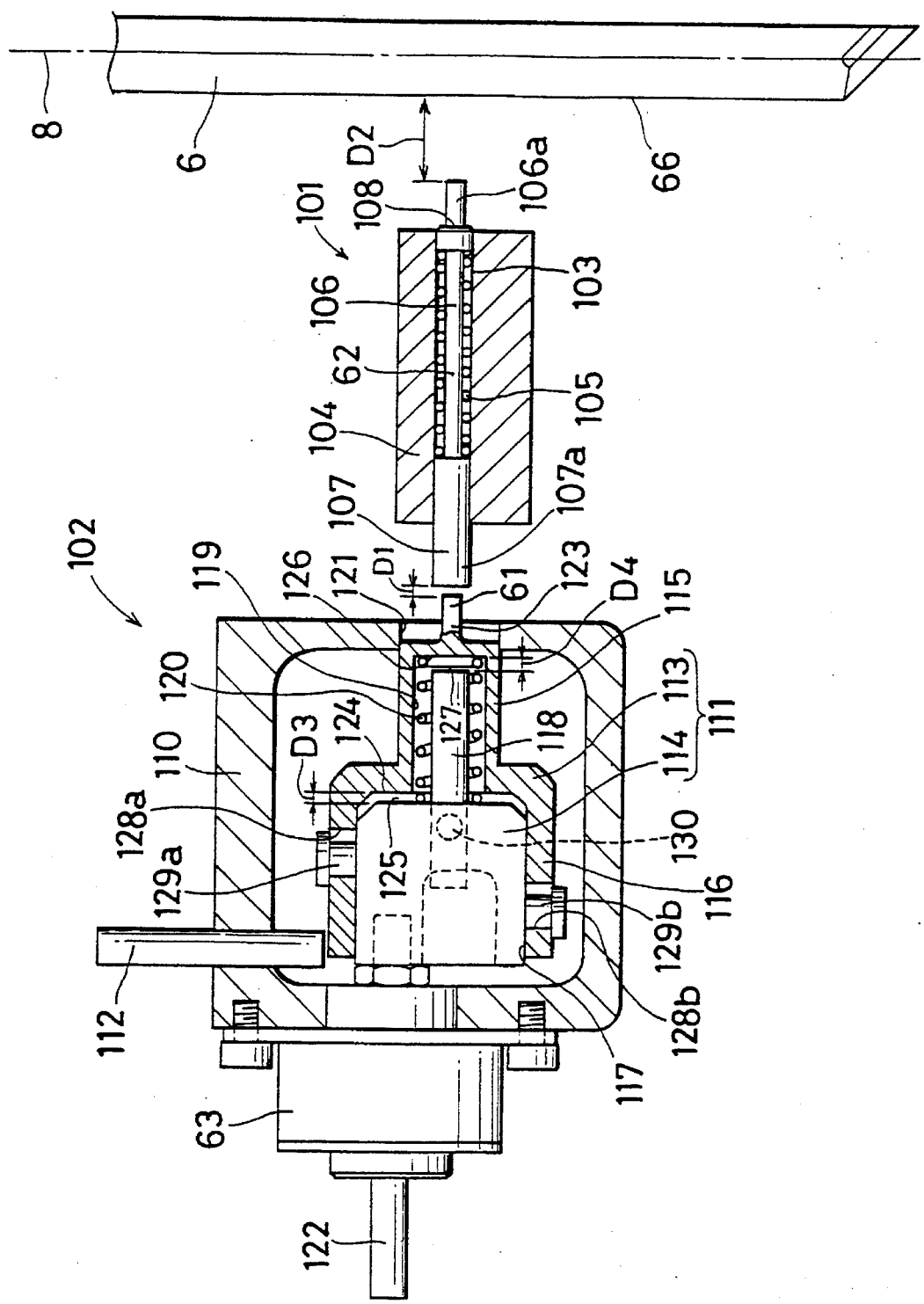
FIG. 4 is a partial sectional view showing a specific apparatus for measuring the width of the blade in the embodiment of FIG. 1.

FIG. 4 is a sectional view showing a specific embodiment for measuring the blade width. The blade width detecting means 60 of the embodiment extends into the work ring 51 and includes a first block 101 housing the detecting pin 62, and a second block 102 provided outwardly in the radial direction from the first block 101 relative to the axis of rotation 8. The first block 101 is fixed to the working ring 51 and includes a holding member 104 having a spring accommodating cylindrical bore 103. A first compression coil spring 105 is accommodated in the cylindrical bore 103 during installation of the detection pin 62. The detecting pin 62 includes a right circular cylindrical portion 106 (hereinafter described as "a small diameter portion") and a right circular cylindrical portion 107 with a larger diameter (hereinafter described as "a large diameter portion"). The large diameter portion is formed integrally at a first end of the small diameter portion 106. A stop ring 108 is fitted near a second end of the small diameter portion for preventing the detecting pin 62 from dislocating from the cylindrical bore 103 due to the spring force of the first compression spring 105.

A front end 106a of the small diameter portion 106 adjacent the cutting blade 6 and an opposite end 107a of the large diameter portion 107 project from opposite ends of the holding member 104. The first block 101 rotates with the working ring 51 about the axis of rotation 8.

The second block 102 includes a casing 110 fixed on the rotary main body 15a, a pressing member 111 accommodated in the casing 110, a linear stepping motor 63 fixed on the casing 110 for driving the pressing member 111, and a proximity switch 112 for detecting the displacement of the pressing member 111. The pressing member 111 includes a cylinder 113 and a piston 114 displaceably accommodated in the cylinder 113. The cylinder 113 is composed of a small diameter cylindrical portion 115 integrally contiguous with a large diameter cylindrical portion 116. A piston chamber, accommodating piston 114, is formed within the large diameter cylindrical portion 116. A spring accommodating bore 119 through cylindrical portion 115, houses a piston rod 118 extending coaxially from the piston 114. A second compression spring 120 is installed around the piston rod to elastically bias the piston 114 radially outward from the axis of rotation 8, i.e. to the left in FIG. 4. The spring constant of the second compression spring 120 is selected to be greater than that of the first compression spring 105.

A penetration hole 121 is formed through casing 110 for insertion of the small diameter cylindrical portion 115 so that it can project outside of the casing 110 when an output shaft 122 of the linear stepping motor 63 is extended to the right in FIG. 3. With the output shaft 122 in the position shown in FIG. 3, a working pin 61 at the front end of a shaft 123 of the small diameter cylindrical portion 115 and the end 107a of the detecting pin 62 are separated from each other by a gap D1. Similarly, the end 106a of the small diameter portion 106 of the detecting pin 62 and the edge 66 of the cutting blade 6 are separated by a gap D2. An inner end wall 124 of the large diameter cylindrical portion 116 of the cylinder 113 and an end 125 of the piston 114 are separated by a gap D3. An end wall 126 of the small diameter cylindrical portion 115 and an end 127 of the piston rod 118 are separated by a gap D4. For example, the gap D1 may be 1.5 mm, the gap D2 may be 7.5 mm, the gap D3 may be 1.0 mm, and the gap D4 may be 1.0 mm.

Guide slots 128a, 128b are formed in the large diameter cylindrical portion 116 of the cylinder 113, and guide pins 129a, 129b, fixed on the piston 114, are movably inserted in the slots 128a, 128b.

The linear stepping motor 63 has a step size of 0.029 m/pulse and a lead pitch of 0.7 mm/revolution. For example, the motor is capable of driving and displacing the output shaft 122, by expanding and contracting, at a moving speed of 12 mm/sec. at 420 pulses/sec.

An abutting position detecting switch 130 is provided for detecting contact between the front end 106a of the detecting pin 62 and the edge 66 of the cutting blade 6. When the abutting position detecting switch 130 is actuated in the off state of the proximity switch 112, i.e. when the output shaft 122 of the linear stepping motor 63 is extended to move the pressing member 113 to the right in FIG. 3, the front end 106a of the detecting pin 62 abuts against the edge 66 so that the blade width can be measured. From the difference between the blade widths, before and after polishing, the polishing amount of the cutting blade 6 may be determined.

Figure 5:
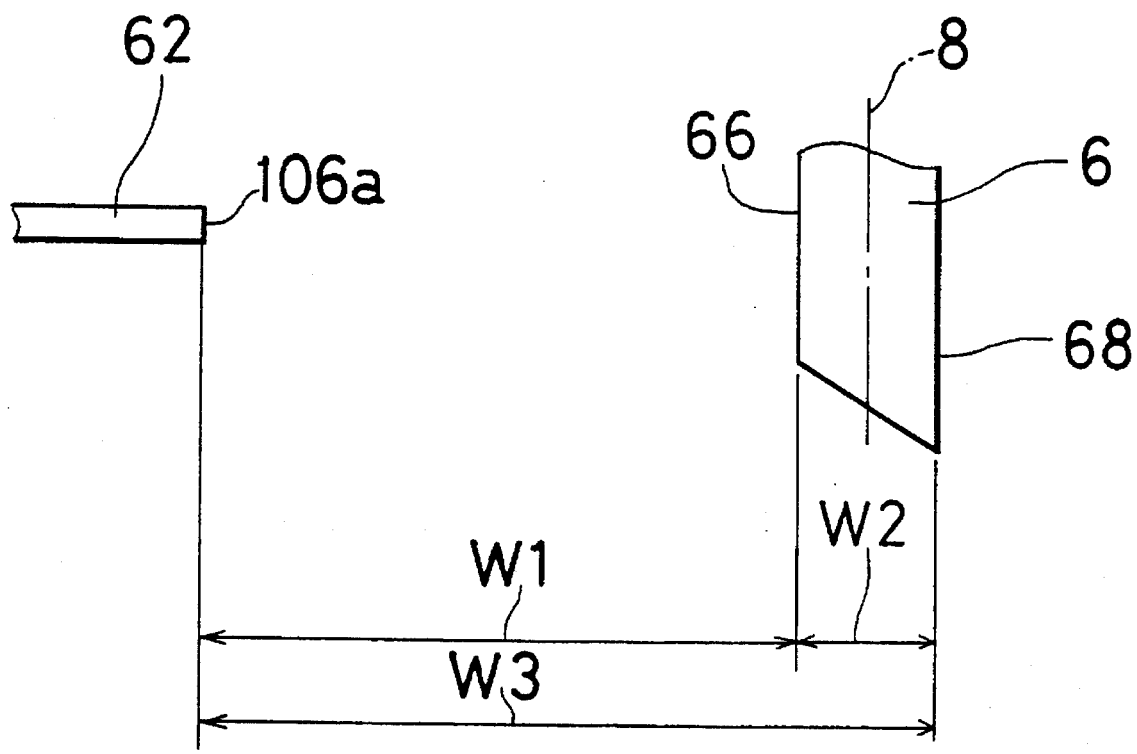
FIG. 5 is a diagram for explaining the method of calculating the width of the blade in the embodiment of FIG. 1.

FIG. 5 shows the principles involved in the measurement of blade width. W1 is equal to the gap D2 when the gaps D1 and D3 are 0. Supposing the blade width of the cutting blade 5 to be W2, the distance W3 from the front end 106a of the detecting pin 62 to a ridge 68 of the cutting blade 6 is constant due to the mechanical configuration of the blade width detecting means 60 and cutting blade 6. What is detected directly is the distance W1. The blade width W2 is determined by the calculation of W2=W3−W1. Also, the blade width can be also measured optically by the use of laser beams. The polishing amount can also be measured by detecting the change of the distance W1, i.e. the change of the blade edge position. Also, the edge position can be optically or electrically detected.

If the blade width is accurately measured, the position of the blade edge 66 is accurately calculated even when the width of the cutting blade changes due to wearing or replacement. If the cutting data delivered to the cutting head 1 is compensated by the change of the blade width, the sheet material 3 can be cut accurately along a cutting line.

Figure 6:
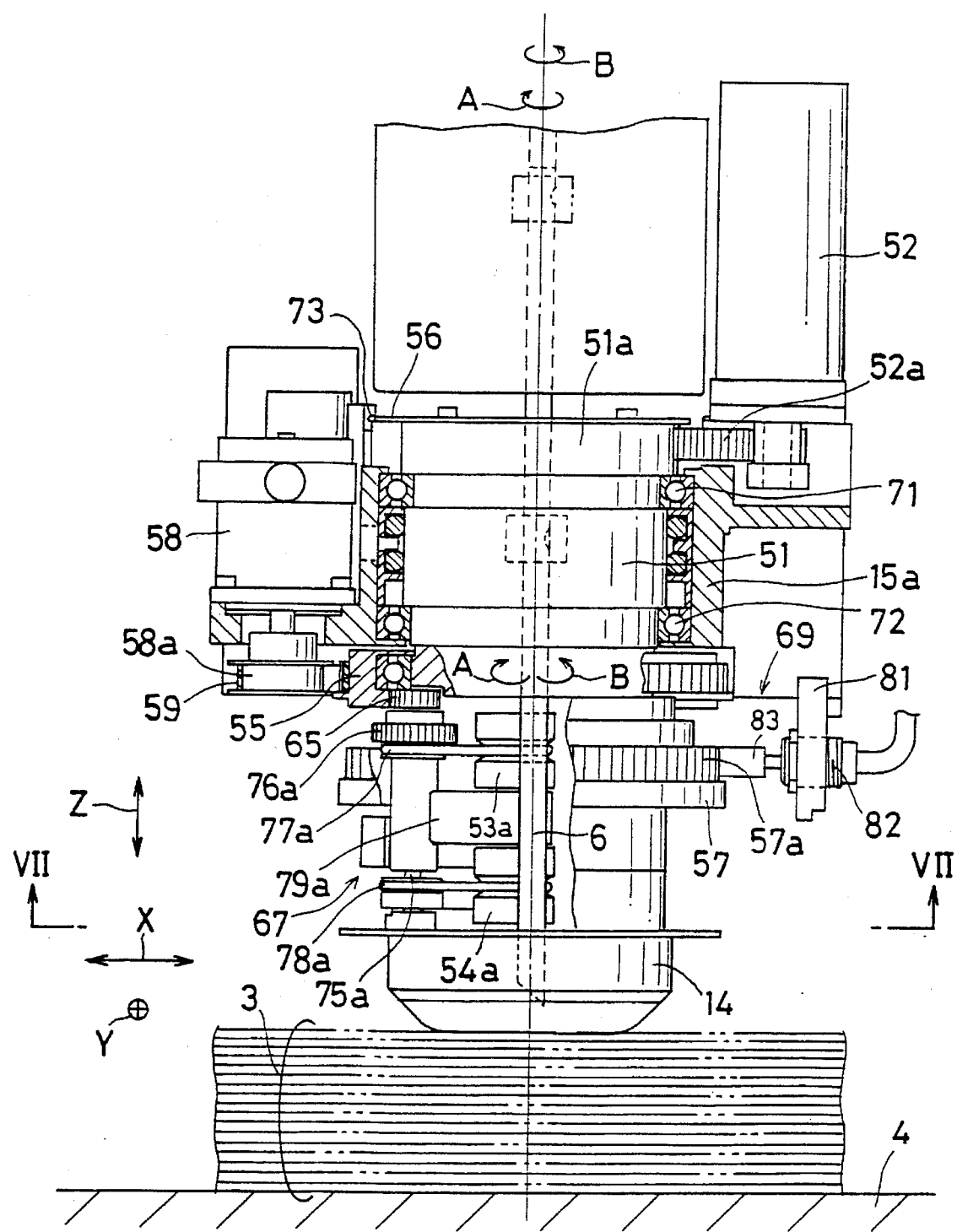
FIG. 6 is sectional view showing an apparatus for polishing the blade of the embodiment of FIG. 1.
Figure 7:
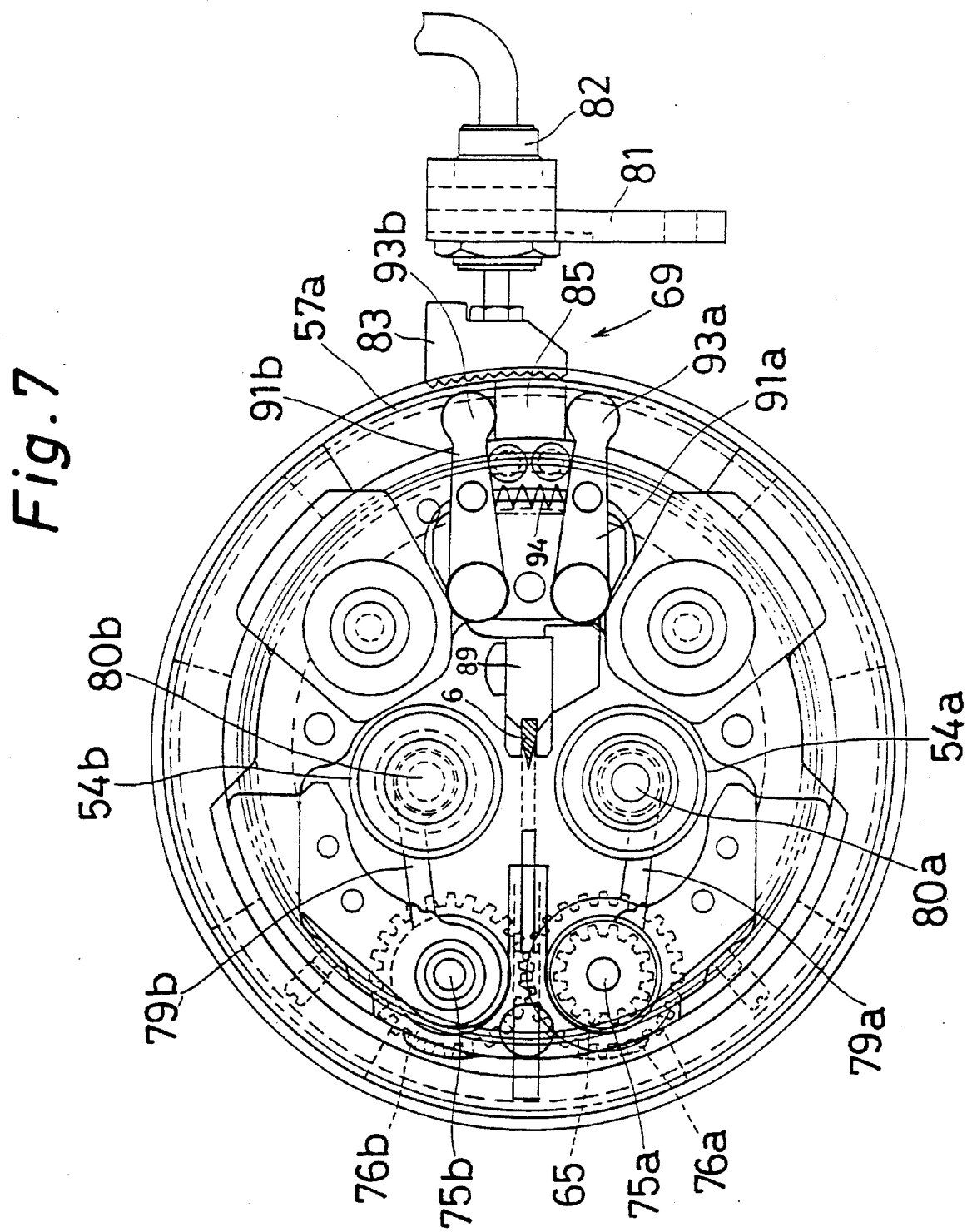
FIG. 7 is a magnified sectional view taken along line VII—VII of FIG. 6.
Figure 8:
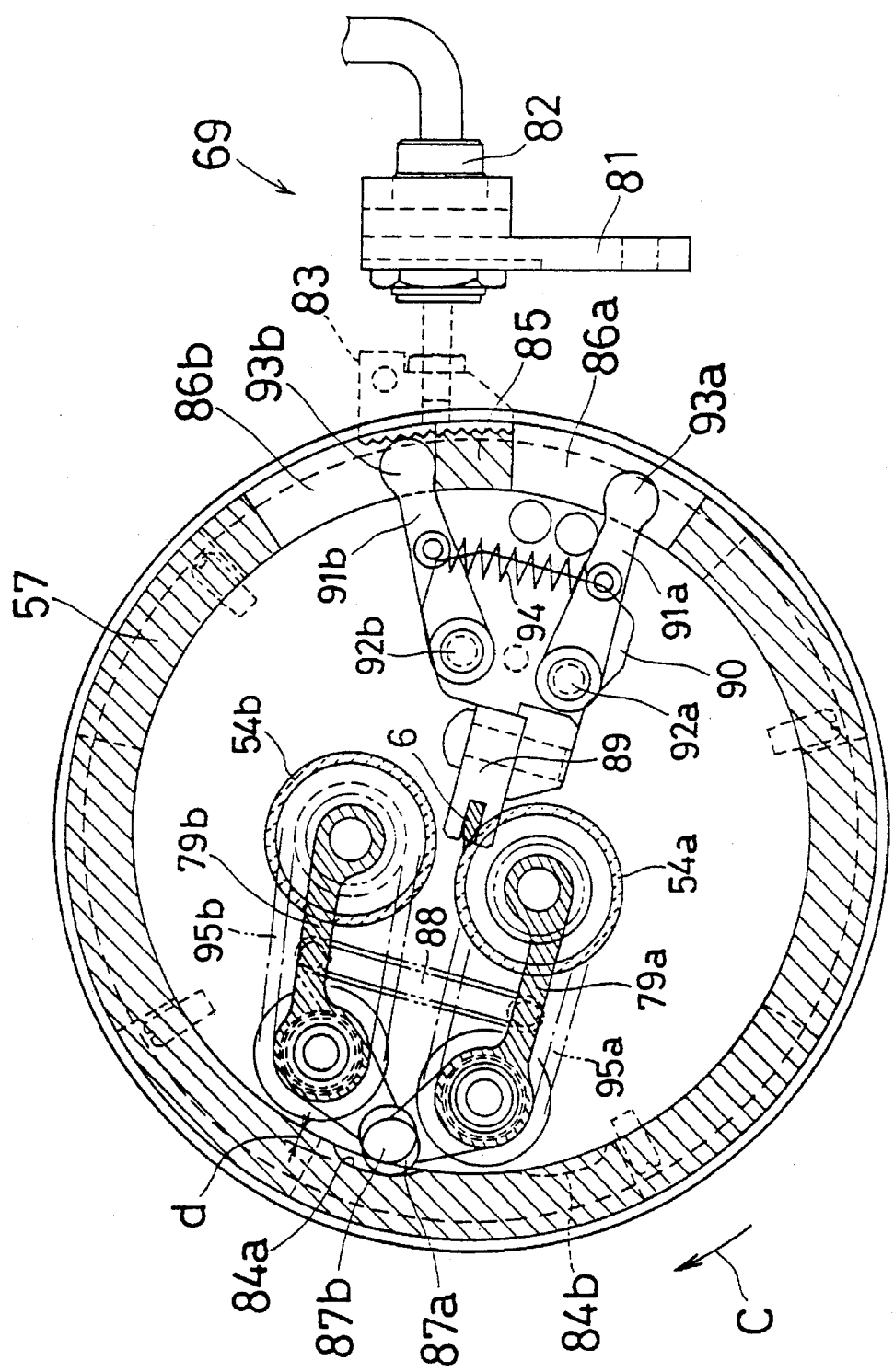
FIG. 8 is magnified sectional view taken along line VII—VII of FIG. 6 showing a polishing operation.

FIGS. 6 to 8 relate to the polishing of cutting blade 6. FIG. 6 is a partial sectional view, and FIG. 7 and FIG. 8 are sectional views taken along line VII–VII of FIG. 6.

The driving force from a motor 58 is transmitted to an outer circumferential surface of the internal gear 55 through a pulley 58a and a timing belt 59. Rotation transmitting means 67 transmits the rotation of the planet gear 65, which is engaged with an inner circumferential surface of the internal gear 55, to the polishing rollers 53a, 53b, 54a, 54b. Locking means 69 is provided to stop the rotation of the work ring 51.

The working ring 51 is rotatably mounted in the main body 15a through a pair of upper and lower bearings 71, 72. An origin cam 56 is provided above the working ring 51. An origin detector 73 is provided near the peripheral edge of the origin cam 56. When a protrusion on the origin cam 56 is at the position of the origin detector 73, it locates the direction of the edge of the cutting blade 6.

In the rotation transmitting means 67, the planet gear 65 is fixed to the shaft 75a. Another shaft 75b is disposed parallel to the shaft 75a and mutually engaged gears 76a, 76b are fixed on the shafts 75a, 75b, respectively. The torque of the plane gear 65 is transmitted to gear 76b through gear 76a. On the shaft 75a, a pair of pulleys 77a, 78a are spaced along the Z-axis. The same holds true with the other shaft 75b. One end of oscillating members 79a, 79b is fixed to the respective shaft between the pulleys. At the other end of the other end of the oscillating members 79a, 79b are fixed to shafts 80a, 80b. The polishing rollers 53a, 54a; 53b, 54b are rotatably attached to opposite ends of the shafts 80a, 80b.

The mounting piece 81 is fixed to the main body 15a and the lock means 69 is provided on the mounting piece 81. The lock means 69 includes a pneumatic cylinder 82 fixed on the mounting piece 81 and an abutting piece 83 affixed to the front end of a piston rod of the pneumatic cylinder 82. The abutting piece 83 abuts against or moves away from the outer circumference of the toothed part 57a of the cam ring 57 so that the rotation of the cam ring 57 may be stopped.

As shown in FIG. 8, cam grooves 84a, 84b are convex in the radial direction away from the inner circumference of the cam ring 57. Two penetration holes 86a, 86b extend through the cam ring and form an abutting part 85 therebetween. Followers 87a, 87b, formed integrally with the oscillating members 79a, 79b are fitted in cam grooves 84a, 84b and are guided by the respective cam surfaces. Both ends of a tension coil spring 88 are connected to oscillating members 79a, 79b to bias the pairs of polishing rollers 53a, 54a; 53b, 54b toward each other. As a result the followers 87a, 87b are biased radially outwardly into grooves 84a, 84b and against the respective cam surfaces.

The cutting blade 6 extends into a guide groove of a guide member 89 attached to a working ring 51. A mounting piece 90 is fixed to the guide member 89. The mounting piece 90 is attached to two oscillating arms 91a, 91b by pins 91a, 92b. Free ends 93a, 93b of the oscillating arms 91a, 91b extend into the penetration holes 86a, 86b. The free ends of oscillating arms 91a, 91b are spring-biased toward each other by a tensile coil spring 94. When the abutting piece 83 is spaced from the toothed part 57a of the cam ring 57, the cam ring 57 and working ring 51 are rotated in unison and the followers 87a, 87b remain in the middle of the two cam grooves 84a, 84b.

When compressed air is supplied into the pneumatic cylinder 82 the piston rod is extended and the abutting piece 83 engages the other circumference of the toothed part 57a, thereby blocking the rotation of the cam ring 57. When the driving motor 52 is operated, the working ring 51 rotates slightly in a direction C. The follower 87a moves into the cam groove 84a and the free end 93b of the oscillating arm 91b engages the abutting part 85. By resisting the spring force of tensile coil spring 94 the oscillating arm 91b is angularly displaced in the direction away from the other oscillating arm 91a. At this time the revolution of the planet gear 65 is restrained and the rotation of the inner tooth gear 55 is transmitted to the polishing rollers 53a, 54a; 53b, 54b through the planet gear 65, shafts 75a, 75b, gears 76a, 76b, pulleys and belts 95a, 95b. The rotating speed of these polishing rollers 53a, 54a; 53b, 54b is selected to be around 4500 to 8000 rpm. One side of the cutting blade edge 6 is polished on the polishing roller 54a.

When the driving motor 52 begins to rotate in the reverse direction, the rotation is transmitted to the polishing rollers 53a, 54a; 53b, 54b, and the working ring 51 is rotated in the reverse direction of the rotating direction C. The follower 87b moves into the cam groove 84b so that the other side of the cutting blade 6 is polished. The contact pressure of the polishing rollers 53a, 54a; 53b, 54b on the cutting blade 6 can be adjusted by changing the spring force of the tensile coil spring 88. The polishing amount can be modified by selecting the depth d of the cam grooves 84a, 84b. Accordingly, wherever the rotating position of the cutting blade 6 may be, the cutting blade 6 can be polished by stopping the rotation of the cam ring 57 by the lock means 69.

Since the polishing rollers 53a, 54a; 53b, 54b contact the cutting blade 6 by the oscillation of the oscillating members 79a, 79b, the contact area and angle will vary with changes of the roller diameter. Even if the tensile coil spring 88 is constant, the pressing force on the polishing surface varies. If the specific parameters of the polishing mechanism vary, the characteristics of the amount of change differs. Therefore, for wear of the polishing rollers 53a, 54a; 53b, 54b by repeated polishing, a correction table is set up and the polishing time calculated is corrected, so that it is possible to control with a high degree of precision.

Figure 9:
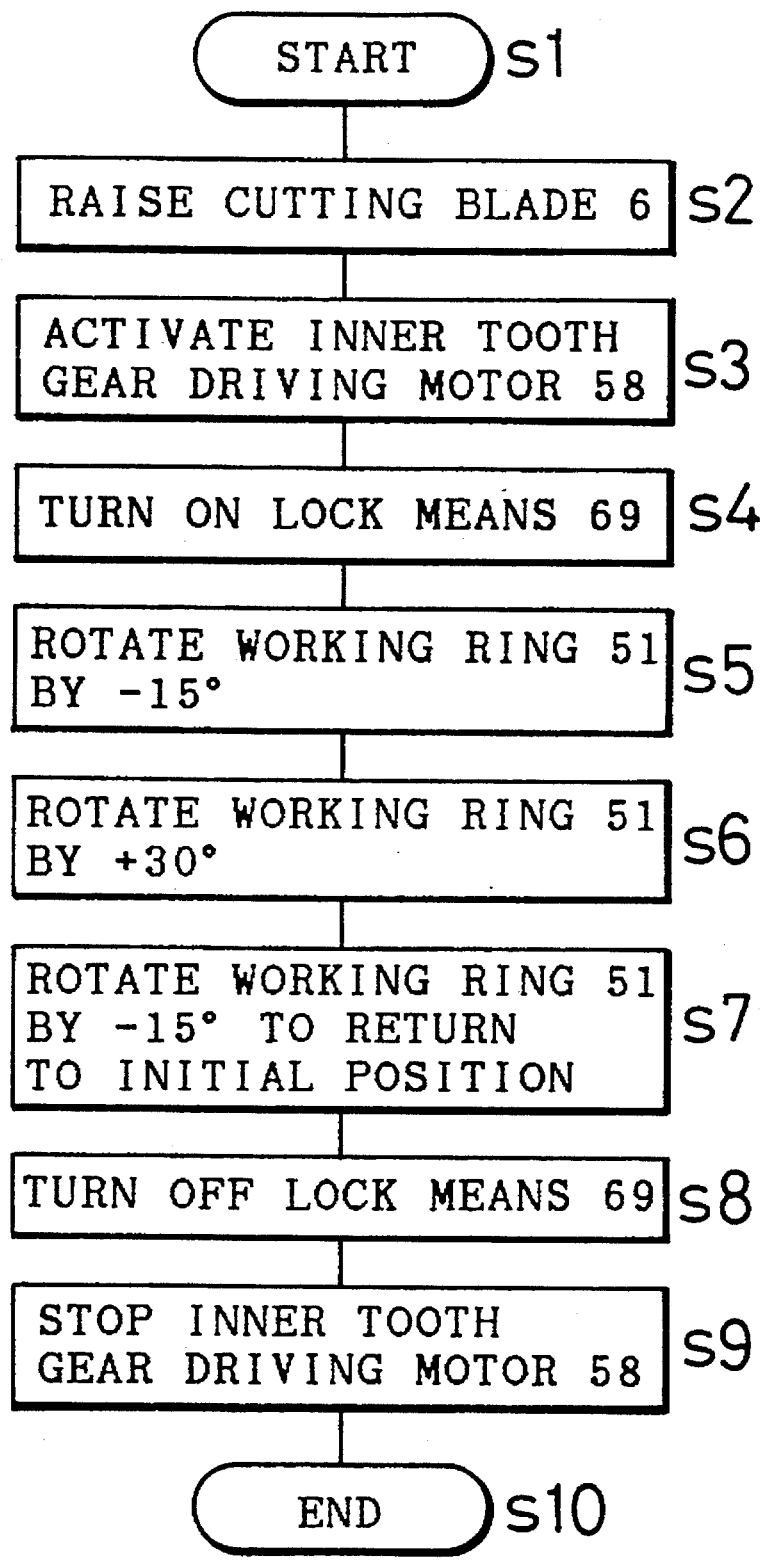
FIG. 9 is a flow chart showing the polishing operation of a cutting blade 6 of the embodiment of FIG. 1.

FIG. 9 is a flow chart for explaining the polishing operation of the cutting blade 6. First, the polishing operation is started at step s1, and the cutting blade 6 is raised and withdrawn from the sheet materials at step s2, and the internal tooth gear driving motor 58 is operated at step s3 to rotate at 4500 to 8000 rpm.

At step s4, the driving motor 52 is stopped, and the lock means 69 is operated to bring the abutting piece 83 in contact with the outer circumference of the toothed part 57a of the cam ring 57 thereby stopping the rotation of the cam ring 57. At step s5, the working ring 51, which is a rotary tube body, is rotated by −15° C. in the arrow C direction with respect to the cam ring 57 and the polishing rollers 53a, 54a are pressed against one side of the cutting blade 6. Polishing continues for a preset polishing time, for example, about 0.2 to 3 seconds.

Next, at step s6, the rotating direction of the driving motor 52 is reversed and the working ring 51 is rotated by +30° C. Therefore, the other side of the cutting blade 6 is polished by the polishing rollers 53b, 54b. The driving motor 52 is reversed at step s7 and then the polishing rollers 53a, 54a; 53b, 54b are returned to their initial position. At step s8 the abutting piece 83 is withdrawn from the outer circumference of the toothed part 57a. At step s9 the internal gear driving motor 58 is stopped. At step s10 the polishing operation is terminated, thereby initiating the next cutting operation.

When moving to the next cutting pattern or for other purpose, the cutting blade 6 is withdrawn from the sheet materials 3 and the cutting operation is interrupted. The cutting blade can be polished uniformly and promptly regardless of its direction.

Figure 10:
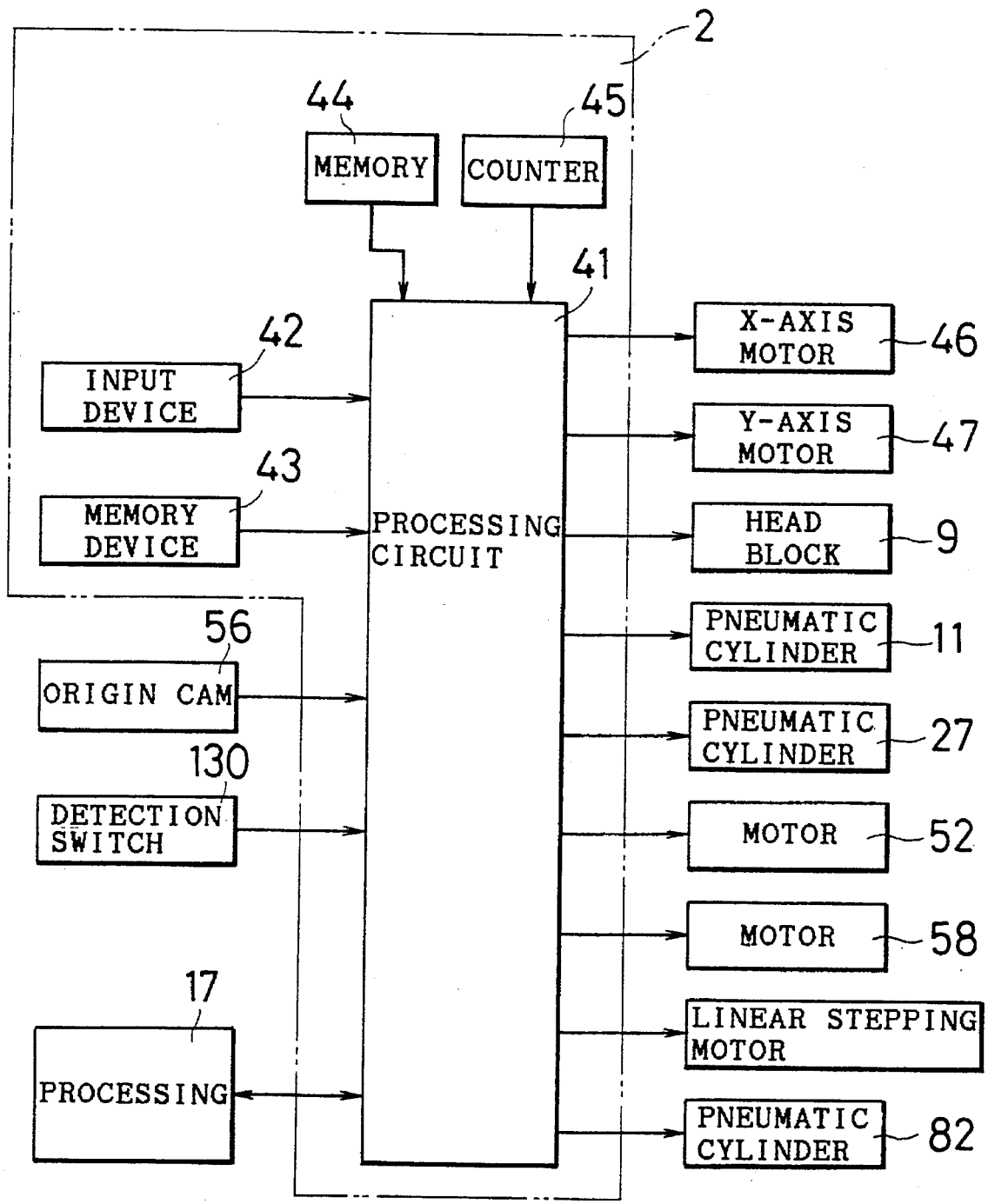
FIG. 10 is a block diagram showing an electrical diagram of the control means 2 of the embodiment of FIG. 1.

FIG. 10 shows an electrical diagram relating to the control means 2 shown in FIG. 2. The control means 2 includes a processing circuit 41, an input device 42, a memory device 43, a memory 44, and a counter 45. The processing circuit 41 may be a microcomputer. The commands and conditions for cutting and polishing are entered in input device 42. In the memory device 43, the cutting data, default values about polishing and measuring, data about the life of the grindstone and others are stored in memory medium such as a floppy disk. In the memory 44, the previous blade width measurement, and various other related data are stored. The counter 45 is used for counting the number of times the blade is polished. An X-axis motor 46 and a Y-axis motor 47 are driven when moving the cutting head 1 in the X-direction and the Y-direction as shown in FIG. 1.

Figure 11:
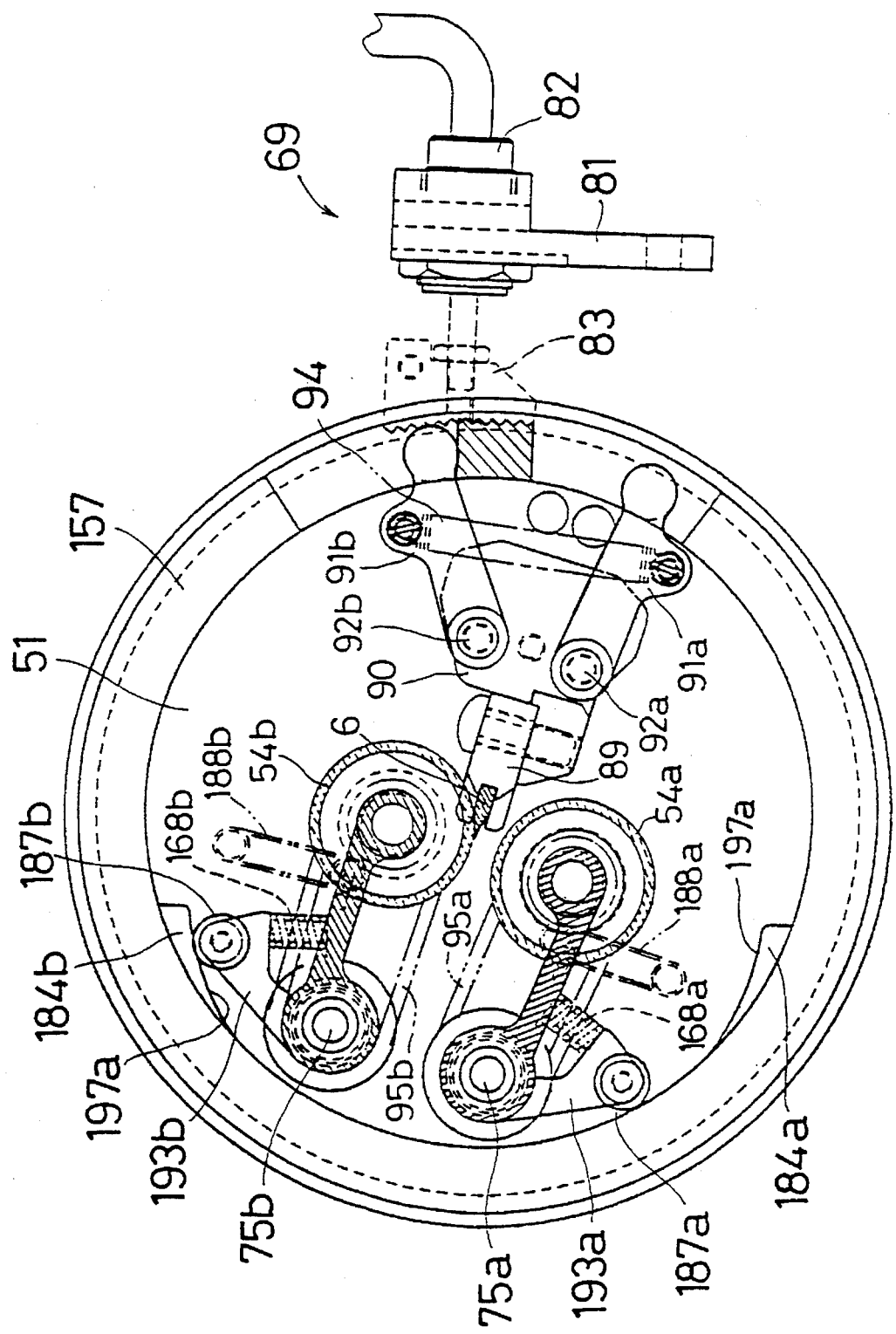
FIG. 11 is a sectional view of another embodiment of the invention.
Figure 12:
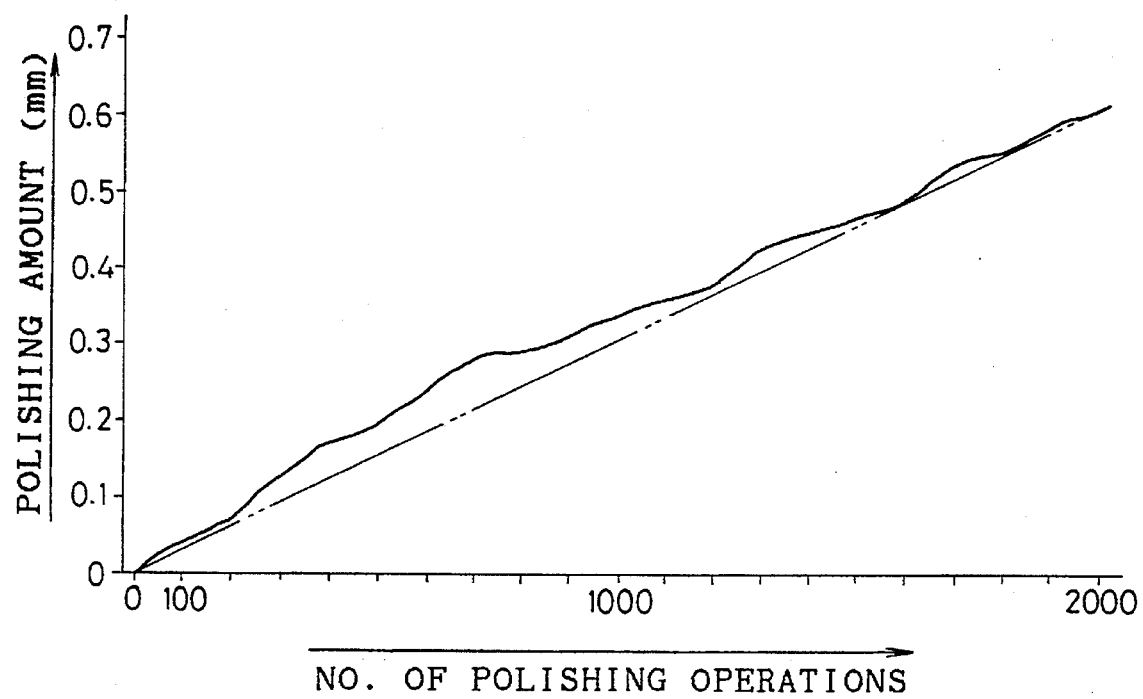
FIG. 12 is a graph showing the relationship between the polishing frequency and polishing amount of a cutting blade.

FIG. 11 is a sectional view showing another embodiment of the invention. Two guide protrusions 184a, 184b project inwardly from the inner circumference of a cam ring 157 and are spaced along an inner peripheral surface thereof. Rollers 187a, 187b are guided on these cam surfaces 197a, 197b, depending on the rotary motion of the working ring relative to the cam ring 157. The rollers 187a, 187b are respectively mounted on the free ends of the arms 193a, 193b which are respectively coupled with the shafts 75a, 75b. Compression coil springs 168a, 168b are interposed between the free ends of these arms 193a, 193b and the oscillating members respectively. Upon displacement of the rollers 187a, 187b inward in a radial direction by the cam surfaces 197a, 197b, the oscillating members are moved toward one another. As a result, the polishing rollers 53a, 54a; 53b, 54b are pressed against the cutting blade 6. The oscillating members are provided with tensile coil springs 188a, 188b. One end of each spring engages an oscillating member while the other end of each of the tensile coil springs 188a, 188b is connected to the working ring 51. The tensile coil springs 188a, 188b function to bias the oscillating members 179a, 179b and polishing rollers 53a, 54a; 53b, 54b away from each other so that they can be returned to their initial positions after completion of the polishing operation.

In the embodiment shown in FIG. 11, the contact pressure of the polishing rollers 53a, 54a; 53b, 54b can be easily adjusted by varying the height of the guide protrusions 184a, 184b or the intensity of the compression springs 168a, 168b. The contact pressure can also be adjusted by varying the relative angular displacement of the working ring 51. Also, higher precision can be realized by correcting the contact pressure in consideration of the wear amount of the polishing rollers 53a, 54a; 53b, 54b.

Control of polishing amount can be adjusted not only by varying the polishing time and contact pressure, but also by varying the rotational speed of the internal gear driving motor 58.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for measuring a cutting blade width comprising:

a movable head block to be mounted on a support frame and adapted to receive a cutting blade;

a detector to be mounted on a support member and operable to detect a predetermined radial orientation of a cutting blade;

a head block positioning device to be mounted on a support member and being operatively connected to said head block for moving said head block between a retracted position and a cutting position; and a cutting blade edge detector to be mounted on a support member and operable to contact a cutting blade edge to detect the position thereof.

2. The apparatus for measuring a cutting blade width as claimed in claim 1, further comprising:

a processor operatively connected to said cutting blade edge detector for receiving signals corresponding to a detected blade edge and deriving a change in cutting blade width by comparing a detected value to a reference cutting blade width.

3. The apparatus for measuring a cutting blade width as claimed in claim 1, further comprising:

a rotatable cylindrical body to be mounted on the adjustable support member and adapted to rotatably engage a cutting blade along a central axis of said cylindrical body; and wherein a part of said cutting blade edge detecting means extends through a wall of said cylindrical body toward said central axis for contacting and detecting a cutting blade edge.

4. The apparatus for measuring a cutting blade width as claimed in claim 3, wherein said part of said blade edge detector comprises a detecting pin adapted to contact a cutting blade.

5. The apparatus for measuring a cutting blade width as claimed in claim 1, wherein said cutting blade edge detector comprises a detecting pin and a detecting pin driver adapted to move said pin into contact with a cutting blade edge to detect the position of thereof.

6. A cutting apparatus comprising:

a cutting blade;

a sheet material support surface;

a movable head block to be mounted on a support frame and coupled to said cutting blade for reciprocating said cutting blade along an axis perpendicular to said support surface, wherein said blade is rotatably coupled to said head block;

a support member;

a detector operable to detect a predetermined radial orientation of said cutting blade;

a cutting blade rotator mounted on said support member and operable to rotate said cutting blade about an axis perpendicular to said sheet material support surface;

a head block positioning device mounted on said support member and operatively coupled with said head block for moving said cutting blade between a cutting position and a retracted position; and a cutting blade edge detector mounted adjacent said cutting blade and operable to engage said cutting blade and detect the position of an edge thereof when said blade has been retracted and positioned in said predetermined radial orientation.

7. A cutting apparatus as claimed in claim 6, further comprising:

a processor operatively connected to said edge detector to receive signals corresponding to a detected blade edge to derive a change in cutting blade width by comparing a detected edge position with a reference cutting blade edge position.

8. The cutting apparatus as claimed in claim 7, further comprising a controller operatively connected to said rotator to direct a cutting operation of said cutting blade to compensate for a change in cutting blade width derived by said processor.

9. The cutting apparatus of claim 6, Wherein said cutting blade rotator comprises a freely rotatable cylindrical body having a central axis and being mounted on said support member, wherein at least a portion of said blade edge detector is located within said freely rotatable cylindrical body in close proximity to said cutting blade.

10. The cutting apparatus of claim 9, wherein said portion of said blade edge detector extends through a wall of said freely rotatable cylindrical body in a radial direction toward said central axis of said cylindrical body.

11. The cutting apparatus as claimed in claim 6, wherein said blade edge detector comprises a detecting pin adapted to contact the blade edge and a detecting pin driver mounted on said support member and operable to move said pin toward said blade edge.

12. The cutting apparatus as claimed in claim 7, further comprising a polishing apparatus for repeatedly polishing the cutting blade during operations of the cutting apparatus according to predetermined conditions; and a controller, operatively connected with said polishing apparatus and said processor, for receiving a derived change in blade width due to a polishing operation and modifying a subsequent polishing operation based on the detected change in blade width.

13. A cutting apparatus comprising:

a support frame;

a movable head block mounted on said support frame and adapted to mount a cutting blade for reciprocating the cutting blade along a verticle axis;

a support member;

a detector operable to detect a predetermined radial orientation of a cutting blade;

a cutting blade rotator mounted on said support member and operable to rotate a cutting blade about its longitudinal axis;

a head block positioning device mounted on said support member and operatively coupled with said head block for moving said head block between a cutting position and a retracted position; and a cutting blade edge detector operable to engage a cutting blade and detect the position of an edge thereof while in said predetermined radial orientation.

14. A cutting apparatus as claimed in claim 13, further comprising:

a processor operatively connected to said edge detector to receive signals corresponding to a detected blade edge to derive a change in cutting blade width by comparing a detected edge position with a reference cutting blade edge position.

15. The cutting apparatus as claimed in claim 14, further comprising a controller operatively connected to said cutting blade rotator for modifying a cutting operation to compensate for a change in a cutting blade width derived by said processor.

16. The cutting apparatus of claim 13, wherein said cutting blade rotator comprises a freely rotatable cylindrical body having a central axis and being mounted on said support member, wherein at least a portion of said blade edge detector is located within said freely rotatable cylindrical body.

17. The cutting apparatus of claim 16, wherein said portion of said blade edge detector extends through a wall of said freely rotatable cylindrical body in a radial direction toward said central axis of said cylindrical body.

18. The cutting apparatus as claimed in claim 13, wherein said blade edge detector comprises a detecting pin adapted to contact a blade edge and a detecting pin driver to be mounted on the support member and operable to move said pin toward a blade edge.

19. The cutting apparatus as claimed in claim 15, further comprising a polishing apparatus for repeatedly polishing a cutting blade during operations of the cutting apparatus according to predetermined conditions; and wherein said controller further being operatively connected with said polishing apparatus and said processor for receiving a derived change in blade width due to a polishing operation and modifying a subsequent polishing operation based on a detected change in blade width.

\* \* \* \* \*